Oct. 2, 1923.

J. L. CROUSE 1,469,211

SPRING QUILL ARM SUPPORTING DEVICE

Filed Jan. 3, 1920

WITNESSES:
H. T. Shelhamer
F. A. Lind

INVENTOR
John L. Crouse
BY
Wesley G. Carr
ATTORNEY

Patented Oct. 2, 1923.

1,469,211

UNITED STATES PATENT OFFICE.

JOHN L. CROUSE, OF WILKINSBURG, PENNSYLVANIA, ASSIGNOR TO WESTINGHOUSE ELECTRIC & MANUFACTURING COMPANY, A CORPORATION OF PENNSYLVANIA.

SPRING QUILL-ARM-SUPPORTING DEVICE.

Application filed January 3, 1920. Serial No. 349,254.

*To all whom it may concern:*

Be it known that I, JOHN L. CROUSE, a citizen of the United States, and a resident of Wilkinsburg, in the county of Allegheny and State of Pennsylvania, have invented a new and useful Improvement in Spring Quill-Arm-Supporting Devices, of which the following is a specification.

My invention relates to means for connecting two relatively movable and adjacently disposed members, and it has particular relation to the means for attaching spring quill arms for use in resilient driving devices to the main body portion of the driving member as in the main drive mechanism of electric locomotives.

The object of my invention is to provide a relatively simple and inexpensive means for mounting the spring arms upon the supporting member therefor, in such manner that it shall be rigidly fixed in position.

Figure 1:
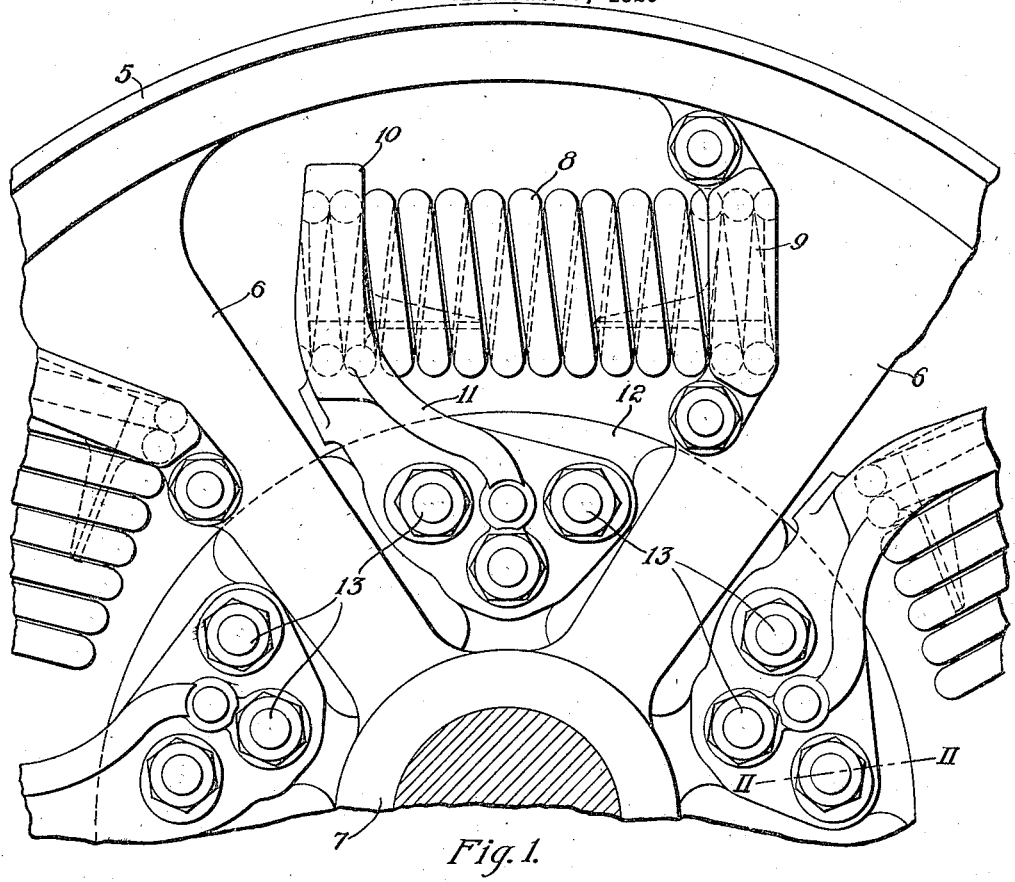
Figure 2:
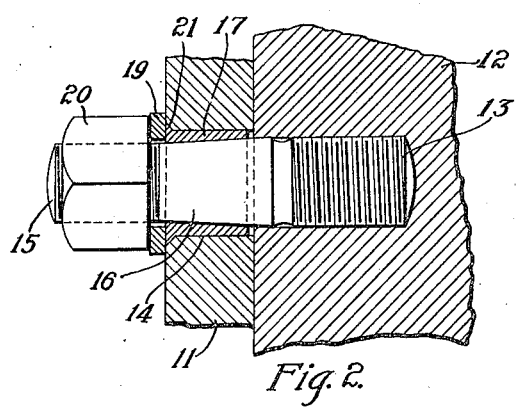
Figures 3, 4:
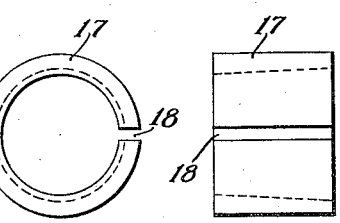

In the accompanying drawings, Fig. 1 is a side elevational view of a portion of a locomotive wheel embodying my invention; Fig. 2 is a sectional view taken at II—II of Fig. 1; and Figs. 3 and 4 are detail views of structures employed therein.

It has been found necessary in the manufacture of electrical locomotives, to insert a resilient or shock absorbing member into the driving connection between the wheels and the motor for the purpose of preventing sudden shocks to the motor and slipping of the wheels on the rail. These shock absorbing members usually comprise a driving and an adjacently disposed driven member in alinement therewith, each of which is provided with arms, the arms from the two separate members being alternately disposed and extending into the same plane perpendicular to the axis of the driving and the driven member. The arms from the two members are connected by helical spring members, the end turns of which are securely held by means of the said longitudinally extending arms.

The spring holding arms are usually separate members attached to the driving or the driven members and, on account of the great strains imposed thereon, difficulty has arisen in properly mounting these arms. Heretofore, various structures have been proposed for accomplishing this purpose, but a common fault of these structures has been that the arms worked loose upon their support, which, of course, impairs the operation of the driving device.

By my invention, I provide a device whereby these members may be rigidly fixed in position, and which, in the event of their working loose, may readily be tightened.

Referring to the drawing for a more detailed understanding of my invention, I show, in Fig. 1, a locomotive wheel 5, provided with arms 6 and a hub 7. The wheel is driven by means of a resilient member 8, one set of end turns of which are held in position by a receiving member 9 mounted on an arm 6. The opposite end of the spring 8 is held in a spring supporting seat 10, which in turn is mounted on a supporting arm 11, radiating from a driving disc 12, which is driven by the motor (not shown). The arm 11 is attached to the disc 12 by means of three studs 13, which are mounted in the disc 12 and extend through openings 14 in the supporting arm 11, as best shown in Fig. 2. The studs 13 are each in threaded engagement with the disc 12, and are provided with a threaded portion 15, at the opposite end thereto, and an intermediate tapered portion 16. The tapered portion 16 is disposed within, but in spaced relation to the opening 14, in the supporting member 11.

Between the intermediately tapered portion 16 of the stud and the walls of the opening 14, which are of a constant diameter throughout the major portion of their length, is inserted a bushing 17, as best shown in Figs. 3 and 4. The bushing 17 consists of a cylindrical member of uniform outside diameter throughout its length and having an inside diameter greater at one end thereof than at the other, providing a tapered or wedge shaped cross-sectional area. One side of the bushing is provided with a slot 18 extending its entire length, which renders it expansible. Referring again to Fig. 2, the bushing 17 is held in position by means of a lock washer 19, and a nut 20 in engagement with the threaded portion 15 of the stud 13.

In assembling the spring supporting arms upon the disc, the studs 13 are first placed in position in the disc 12. The supporting arm 11 is next so positioned that the studs 13 project through the openings therein. The bushings 17 are next inserted between the tapered portion of the studs and the openings in the arm 11 by being driven therebetween, the end of the bushing having smaller cross-sectional area being presented first. The openings 14 in the member 11 are counter-sunk at 21, in order to take care of any portion of the bushing 17 which may have flattened out while being driven into position. After the bushing is in position, the lock washer 19 and the nut 20 are applied, the washer 19 engaging a portion of the arm 11, as well as the end of the washer 17.

From the foregoing description, it will be apparent to those skilled in the art that as the bushing 17 is driven on the tapered portion of the stud 13, it will expand, causing it to engage the walls of the openings 14, as well as the tapered portion of the stud 13, in a wedging engagement. In the event that this bushing should work loose, it may be tightened by turning the nut 20.

While I have shown but one form of my invention, and have described in detail but a single application of the same, it will be obvious to those skilled in the art that it is not so limited, but that various minor modifications and changes may be made therein without departing from the spirit thereof, and I desire, therefore, that only such limitations shall be placed thereon as are imposed by the prior art or are set forth in the appended claims.

I claim as my invention:

1. In combination with a driving member, a plurality of studs secured thereto, a transmission member provided with openings of comparatively large diameter for the reception of the studs, and means for effecting a rigid connection between each stud and the wall of its associated opening independently of the connections between the other studs and the walls of their respective openings.

2. In a driving device, a driving member, a driven member, an arm carried by one of said members and attached thereto by a plurality of securing members, and means for independently adjusting the securing members to compensate for irregularities in the alinement of the securing members.

3. In a driving device, a transmission member provided with an opening of constant diameter, a supporting member therefor provided with a tapered projection disposed within said opening, and a bushing of substantially wedge-shape in cross-section disposed intermediate said projection and the walls of the opening and having its exterior surface adapted to engage the walls of said opening throughout substantially its entire length.

4. In combination, a transmission member provided with a series of openings, a driving member provided with a series of projections co-operating in paired relation with said openings, said projections being disposed within the openings in the first mentioned member, and a split bushing of wedge shape cross-section disposed intermediate each of said projections and its co-operating opening.

5. In a driving device, a transmission member provided with an opening, a driving member provided with a projection, said projection being tapered and being disposed within the opening in the first mentioned member, and a split bushing of wedge shape cross-section disposed intermediate said projection and the sides of said opening.

6. In a driving device, a transmission member provided with an opening of constant diameter, a driving member provided with a tapered pin disposed within said opening, and a bushing of wedge shape cross-section disposed intermediate said pin and the walls of said opening.

7. In combination, a driving member and a transmission member, one of which is provided with an opening of constant diameter, and the other of which is provided with a stud, said stud being provided with a tapered end portion which projects into said opening, a split bushing of wedge shape cross-section interposed between said stud and the walls of said opening, and means disposed in threaded engagement with said stud for holding said bushing in position.

8. In a flexible driving device, a main body member provided with a plurality of studs, a spring holding member provided with a plurality of openings, said studs projecting into said openings, and a wedge-shaped bushing disposed intermediate each of said studs and the walls of the openings into which they project.

9. In an electrical locomotive, an adjacently disposed motor driven and a wheel driving member, springs interposed between said members, and arms mounted on said members and supporting said springs, means for mounting said arms on said members comprising a plurality of studs mounted on said members and extending through openings in said arms, and bushings of wedge-shape cross-section interposed between said studs and the walls of said openings.

10. In an electrical locomotive, a resilient driving means comprising adjacently disposed rotatable members, springs mounted to operatively connect said members, said springs being operatively connected to said members by means of arms mounted thereon and engaging said springs, and means for mounting said arms on said members comprising studs mounted on said members and provided with tapered portions disposed within openings provided therefor in said arms, and split bushings of wedge-shape cross-section interposed between said studs and the walls of said openings.

In testimony whereof, I have hereunto subscribed my name this 1st day of December, 1919.

JOHN L. CROUSE.